(12) United States Patent
Ying et al.

(10) Patent No.: US 9,866,288 B2
(45) Date of Patent: Jan. 9, 2018

(54) METHOD FOR OPERATING A BASE STATION COMPRISING A PLURALITY OF ANTENNAS IN A WIRELESS RADIO NETWORK

(71) Applicant: Sony Corporation, Tokyo (JP)

(72) Inventors: Zhinong Ying, Lund (SE); Erik Bengtsson, Eslöv (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/110,823

(22) PCT Filed: Dec. 10, 2014

(86) PCT No.: PCT/EP2014/077151
§ 371 (c)(1),
(2) Date: Jul. 11, 2016

(87) PCT Pub. No.: WO2015/106888
PCT Pub. Date: Jul. 23, 2015

(65) Prior Publication Data
US 2016/0337011 A1    Nov. 17, 2016

(30) Foreign Application Priority Data
Jan. 17, 2014 (EP) .................................. 14151587

(51) Int. Cl.
*H04B 7/0413* (2017.01)
*H04B 7/08* (2006.01)
(Continued)

(52) U.S. Cl.
CPC ......... *H04B 7/0413* (2013.01); *H04B 7/0691* (2013.01); *H04B 7/0851* (2013.01);
(Continued)

(58) Field of Classification Search
USPC .................. 375/260, 267; 370/329, 337, 336
See application file for complete search history.

(56) References Cited

U.S. PATENT DOCUMENTS

| 7,058,367 | B1 | 6/2006 | Luo et al. | |
| 7,499,427 | B2 * | 3/2009 | Padovani | H04B 7/264 370/329 |

(Continued)

FOREIGN PATENT DOCUMENTS

| WO | 2009023681 A2 | 2/2009 |
| WO | 2010002201 A2 | 1/2010 |

OTHER PUBLICATIONS

International Preliminary Report on Patentability; dated Jul. 28, 2016; issued in International Patent Application No. PCT/EP2014/077151.

(Continued)

*Primary Examiner* — Eva Puente
(74) *Attorney, Agent, or Firm* — James C. Edwards; Moore & Van Allen PLLC

(57) ABSTRACT

The present invention relates to a method for operating a base station (11) in a wireless radio network (10). The base station (11) comprises a plurality of antennas for transmitting radio frequency signals between the base station (11) and a user equipment (UE1, UE2). According to the method, at each antenna (12) a training signal sent from the user equipment (UE1, UE2) is received and for each antenna (12) a corresponding configuration parameter is determined based on the training signal. A plurality of payload information blocks (33) is transmitted between the base station (11) and the user equipment (UE1, UE2) using the determined configuration parameters and a predetermined transmission scheme. For at least one payload information block (33) a transmission quality parameter is determined and an adapted transmission scheme is determined based on the determined quality parameter.

17 Claims, 2 Drawing Sheets

(51) Int. Cl.
*H04B 7/06* (2006.01)
*H04L 1/00* (2006.01)
*H04W 88/02* (2009.01)
*H04W 88/08* (2009.01)

(52) U.S. Cl.
CPC ......... *H04B 7/0874* (2013.01); *H04L 1/0003* (2013.01); *H04L 1/0009* (2013.01); *H04W 88/02* (2013.01); *H04W 88/08* (2013.01)

(56) References Cited

U.S. PATENT DOCUMENTS

| | | | |
|---|---|---|---|
| 2003/0002450 A1 | 1/2003 | Jalali et al. | |
| 2008/0130790 A1 | 6/2008 | Forenza et al. | |
| 2009/0046800 A1* | 2/2009 | Xu | H04B 7/0617 375/267 |
| 2012/0243513 A1* | 9/2012 | Fujishima | H04W 72/085 370/336 |
| 2013/0034089 A1* | 2/2013 | Nakashima | H04L 5/001 370/337 |
| 2013/0107976 A1* | 5/2013 | Matsutani | H04L 27/0012 375/260 |
| 2015/0208389 A1* | 7/2015 | Imamura | H04J 11/00 370/329 |
| 2015/0289213 A1* | 10/2015 | Futagi | H04L 1/0004 455/522 |
| 2017/0013602 A1* | 1/2017 | Agardh | H04B 7/0686 |

OTHER PUBLICATIONS

International Search Report and Written Opinion; dated Jan. 29, 2015; issued in International Patent Application No. PCT/EP2014/077151.

* cited by examiner

METHOD FOR OPERATING A BASE STATION COMPRISING A PLURALITY OF ANTENNAS IN A WIRELESS RADIO NETWORK

FIELD OF THE INVENTION

The present invention relates to a method for operating a base station in a wireless radio network. The present invention relates especially to a method for operating a base station comprising a plurality of antennas for transmitting radio frequency signals according to a so-called multiple-input and multiple-output (MIMO) technology.

The present invention relates furthermore to a base station which implements the method of the present invention, and a user equipment which is configured to be used in connection with the base station.

BACKGROUND OF THE INVENTION

The so-called MIMO technology (multiple-input and multiple-output), which may be used in wireless radio frequency telecommunications, relates to the use of multiple send and receive antennas for a wireless communication at for example a base station or a user equipment. The MIMO technology forms the basis for coding methods which use the temporal as well as the spatial dimension for transmitting information enabling therefore a space and time coding. Thus, a quality and data rate of the wireless communication may be increased.

In a so-called massive MIMO system a plurality of user equipments may be arranged within a cell served by a base station having a plurality of antennas. In the massive MIMO system a configuration of individual antenna transceivers of the base station may vary depending on a location of each of the user equipments and transmission conditions in an environment of the base station and the user equipment.

The massive MIMO system may be used in connection with a time division duplex (TDD) system in which a transmission of an information stream between the base station and a user equipment is split up in time slots. Different time slots for uplink (UL) communication and downlink (DL) communication may be provided for communicating information from the user equipment up to the base station and for communicating information from the base station down to the user equipment. For such a combined massive MIMO TDD system there is a need for an additional time slot which may be called "header". The header is used to send a training signal or training sequence from the user equipment to the base station. Based on the received training sequence, the base station may configure the transceivers of its antenna array. Thus, high antenna gain for the payload transmitted in the following time slots can be achieved. The payload may be transmitted in a number of uplink and downlink time slots. However, when the user equipment is moving, the channel quality may degrade due to a change of the spatial arrangement between the base station and the user equipment. The faster the user equipment is moving, the faster the channel quality may degrade. The channel quality may be measured as a bit error rate (BER). If there are multiple UL/DL slots within one frame, depending on the moving speed of the user equipment, only the first time slots of the frame may be adapted to be used before being degraded significantly by the increased bit error rate. To avoid this problem, the header rate may be increased such that the training sequence is transmitted more frequent. However, this will have impact on the system capacity, especially as all user equipments in the cell and in neighboring cells need to be synchronized.

Therefore, there is a need to improve a data transmission in a massive MIMO system to mitigate deterioration due to mobility of a user equipment.

SUMMARY OF THE INVENTION

According to the present invention, this object is achieved by a method for operating a base station in a wireless radio network as defined in claim 1, a base station for a wireless radio network as defined in claim 8, and a user equipment for a wireless radio network as defined in claim 15. The dependent claims define preferred and advantageous embodiments of the invention.

According to an aspect of the present invention, a method for operating a base station in a wireless radio network is provided. The base station comprises a plurality of antennas for transmitting radio frequency signals between the base station and a user equipment. According to the method, at each antenna of a subset of the plurality of antennas a training signal sent from the user equipment is received. Based on the training signal received at each antenna of the subset, a corresponding configuration parameter is determined for the corresponding antenna. The subset may comprise those antennas of the plurality of antennas which are arranged to receive the training signal from the user equipment. For example, if the plurality of antennas of the base station are arranged cylindrically, only a subset of the antennas may receive the training signal from the user equipment, whereas some other antennas may not receive the training signal. Furthermore, if a very large antenna array is used, only a part or a subset of the array of antennas may be used for a specific user equipment. However, the subset may also comprise all antennas of the plurality of antennas provided at the base station. Due to the configuration parameters determined for each antenna of the subset of the plurality of antennas, the base station may be enabled to communicate with the user equipment according to the above-described MIMO technology. According to the method, a plurality of payload information blocks is transmitted between the base station and the user equipment using the determined configuration parameters for the antennas and using additionally a predetermined transmission scheme. The transmission scheme may comprise for example an error correction scheme, especially a so-called forward error correction scheme, enabling to recover or correct disturbed information symbols or information bits, a radio frequency modulation scheme defining for example frequencies or frequency bands to be used for transmitting information symbols or bits of the payload, or a digital coding scheme defining for example a mapping of payload information bits to information symbols according to a spreading code. For at least one payload information block of the plurality of payload information blocks a transmission quality parameter is determined and an adapted transmission scheme is determined based on the determined transmission quality parameter. The quality parameter may comprise for example a bit error rate, a symbol error rate, a signal to noise ratio, a signal to interference ratio or an absolute signal level. Furthermore, the quality parameter may comprise a velocity dependent signal quality, i.e., a transmission quality may be determined or estimated based on a change of a spatial arrangement of the base station and the user equipment or other components in an environment of the base station and the user equipment. For example, when the bit error rate or the symbol error rate rises due to a movement of the user equipment out of a transmission focus provided by the current configuration parameters for the antennas of the base station, an improved error correction scheme may be determined and used for future data transmissions. Additionally or as an alternative, the radio frequency modulation scheme or the digital coding scheme may be adapted such that a more reliable or fault tolerant communication can be provided, and the adapted transmission scheme may be used in future transmissions. Thus, the transmission scheme may be dynamically adapted during transmission of payload information blocks such that a deterioration of the quality of the payload information may be mitigated significantly. Preferably, the quality parameter is determined based on the uncorrected transmitted information, i.e. the quality parameter may be determined based on the disturbed information bit before being corrected.

The plurality of payload information blocks transmitted between the user equipment and the base station may comprise a plurality of uplink (UL) payload information blocks sent from the user equipment to the base station and a plurality of downlink (DL) payload information blocks sent from the base station to the user equipment. The transmission scheme used for transmitting the individual payload information blocks may be selected by either the base station or the user equipment, but uplink and downlink payload information blocks may have different transmission schemes as the hardware capabilities may be different in the base station and the user equipment. Therefore, either the base station or the user equipment may decide which transmission scheme to be used for the individual payload information blocks, or, as an alternative, the user equipment may decide which transmission scheme is to be used for transmitting the payload information blocks in one direction and the base station may decide which transmission scheme is to be used for transmitting the payload information blocks in the other direction. For example, the user equipment may detect a transmission quality parameter for the downlink payload information blocks and may order or propose a corresponding transmission scheme for following downlink payload information blocks. Vice versa, the base station may detect a transmission quality parameter for the uplink payload information blocks and may order or propose a corresponding transmission scheme for following uplink payload information blocks.

According to an embodiment, the plurality of payload information blocks comprises at least a sequence of a first payload information block and a second payload information block. The transmission quality parameter of the first payload information block is determined, and based on the determined transmission quality parameter of the first payload information block the adapted transmission scheme is determined. The second payload information block is transmitted using the adapted transmission scheme. In other words, the transmission scheme may be adapted from one payload information block to the next payload information block. Thus, within a frame comprising a plurality of payload information blocks to be transmitted, the transmission scheme may be dynamically adapted from payload information block to payload information block. This enables an improved robustness and an efficient data transmission, as for example an error correction scheme with improved correction capabilities and thus requiring more overhead information to be transmitted, is only selected when this is required due to an increased bit error rate or symbol error rate.

According to another embodiment, at least a first transmission frame and a second transmission frame are transmitted subsequently between the base station and the user equipment. Each transmission frame comprises a corresponding training sequence and a corresponding plurality of payload information blocks. A plurality of adapted transmission schemes is determined based on corresponding transmission quality parameters which have been determined for corresponding payload information blocks of the first transmission frame. Based on the plurality of adapted transmission schemes a transmission scheme profile is determined. The payload information blocks of the second transmission frame are transmitted using the determined transmission scheme profile. The transmission scheme profile defines for each payload information block of the second transmission frame a corresponding transmission scheme. For example, during transmission of the first transmission frame, for each payload information block of the first transmission frame a corresponding quality parameter is determined. For each determined quality parameter a corresponding adapted transmission scheme is determined, and the transmission scheme profile comprises these adapted transmission schemes as a sequence.

For example, the sequence of payload information blocks of the first transmission frame may decrease in quality as determined by the corresponding quality parameters. Therefore, the corresponding adapted transmission schemes provide for example an increasingly improved error correction scheme or an increasingly improved digital coding scheme. When the second transmission frame is started, at the beginning a training sequence is transmitted and the corresponding configuration parameters for the antennas are determined and will be used during transmission of the payload information blocks of the second transmission frame. Therefore, the second transmission frame starts with well-adapted configuration parameters and a high data transmission quality. Assuming that the user equipment continues moving as during transmission of the first transmission frame, the following payload information blocks of the second transmission frame will be degraded and therefore an improved error correction scheme or an improved digital coding scheme may be necessary to provide sufficient quality of the payload. Under the assumption that the user equipment continues moving essentially as during transmission of the first transmission frame, this can be accomplished by adapting the transmission scheme according to the transmission scheme profile determined based on the transmissions of the first transmission frame. The transmission scheme profile which will be used during transmission of the second transmission frame may be communicated from the base station to the user equipment such that the transmission of the payload information blocks can be performed with varying transmission schemes without further communication in between the base station and the user equipment. However, the transmission schemes of the transmission scheme profile may be used one by one by the base station for each payload information block.

The above-described transmission frame comprising a training sequence and the plurality of payload information blocks may be transmitted within one time slot of a time division duplex transmission scheme (TDD). Due to the dynamic transmission scheme adaption as described above and by having multiple payload information blocks, for example multiple UL/DL slots, the introduced latency is comparably low while the potential data rate for the payload is compromised only in case of a moving device. Therefore, a communication system using the above method may support moving user equipments as well as non-moving user equipments automatically in an efficient way.

The configuration parameter determined for each antenna of the subset of the plurality of antennas of the base station may comprise for example an amplitude information, a phase information, a parameter pair comprising an amplitude information and an associated phase information, a plurality of these parameter pairs, or a signal intensity information of a signal intensity received at the corresponding antenna during receiving the training signal. However, the above-listed types of configuration parameters are only examples and the configuration parameters may comprise other or additional information for configuring the antennas of the base station to enable a data transmission according to the above-described MIMO transmission scheme. Furthermore, the phase and amplitude information may be used directly to determine the configuration parameter for receiving uplink payload information blocks from the user equipment, as the training sequence has been sent in the same uplink direction. However, the configuration parameter for sending downlink payload information blocks to the user equipment may be determined based on a Hermitian transpose of the configuration parameter for receiving uplink payload information blocks. For example, if two uplink signal beams from the user equipment are received at the base station with different delay (phase), for sending downlink beams the phases need to be reversed as the beam with the shorter path comes in first and both beams need to be aligned at the user equipment in the downlink direction.

According to another aspect of the present invention, a base station for a wireless radio network is provided comprising a plurality of antennas for transmitting radio frequency signals between the base station and a user equipment, and a processing device. The processing device is configured to receive at each antenna of a subset of the plurality of antennas a training signal sent from the user equipment. Furthermore, the processing device is configured to determine for each antenna of the subset a corresponding configuration parameter based on the training signal which has been received at the corresponding antenna. Based on the determined configuration parameters for the antennas and based on a predetermined transmission scheme, the processing device is configured to transmit a plurality of payload information blocks between the base station and the user equipment. The term "transmit" as it is used in the present description may relate to receiving information from the user equipment at the base station as well as sending information from the base station to the user equipment. The configuration parameters for the antennas may be different for receiving payload information blocks and for sending information blocks. The same applies to the used transmission schemes. However, the configuration parameter for an antenna for sending as well as a configuration parameter for the antenna for receiving may be determined based on the training signal. During transmission of the payload information blocks the proceeding device is furthermore configured to determine for at least one payload information block of the plurality of payload information blocks a transmission quality parameter. Further, the processing device may be configured to determine for all payload information blocks a corresponding transmission quality parameter. Based on the determined transmission quality parameter the processing device is configured to determine an adapted transmission scheme. The adapted transmission scheme may provide a different or improved error correction scheme compared to the predetermined transmission scheme, or a different radio frequency modulation scheme or a different digital coding scheme.

Thus, an amount of overhead data to be transmitted in connection with a single payload information block may vary depending on the used transmission scheme. However, also the possibility to recover the payload entirely and fault free may vary depending on the used transmission scheme. Therefore, by adapting the transmission scheme depending on the quality of a previously transmitted payload information block, a continuous high quality data transmission for the payload may be provided. The transmission quality parameter may be determined in terms of a bit error rate or a symbol error rate. Preferably, in case an error correction scheme is used, the transmission quality parameter is preferably determined before the transmitted data is corrected by the error correction scheme.

According to an embodiment, the plurality of payload information blocks comprises at least a sequence of a first payload information block and a second payload information block. The processing device is configured to determine the transmission quality parameter for the first payload information block and to determine the adapted transmission scheme based on the determined transmission quality parameter of the first payload information block. Then, the second payload information block is transmitted using the adapted transmission scheme. Due to the dynamic adaption of the transmission scheme, for example from payload information block to payload information block, a reliable data transmission may be provided even when the user equipment is moving.

According to another embodiment, the base station is configured for subsequently transmitting at least a first transmission frame and a second transmission frame between the base station and the user equipment. Each transmission frame comprises a corresponding training sequence and a corresponding plurality of payload information blocks. The processing device is configured to determine a plurality of adapted transmission schemes based on corresponding transmission quality parameters determined for corresponding payload information blocks of the first frame. Furthermore, the processing device is configured to determine a transmission scheme profile based on the plurality of adapted transmission schemes, and to transmit the payload information blocks of the second transmission frame using the transmission scheme profile. The transmission scheme profile defines for each payload information block of the second transmission frame a corresponding transmission scheme. Thus, a degradation of the transmission of each payload information block is determined during transmission of the payload information blocks of the first transmission frame, and this information is bundled in a transmission scheme profile indicating for each payload information block of the second transmission frame a corresponding transmission scheme which is adapted to compensate at least partly the degradation expected for the payload information blocks of the second transmission frame. Thus, the transmission of the payload information blocks of the second transmission frame may be improved by gradually improving the transmission scheme according to the transmission scheme profile, for example by increasing error correction capabilities of an error correction scheme, or by changing a digital coding scheme to a more complex and more robust digital coding scheme.

According to a further aspect of the present invention, a user equipment for a wireless radio network is provided. The user equipment is configured to transmit radio frequency signals between the user equipment and the above-described base station. In particular, the user equipment is configured to send, for example, in a header of a transmission frame, the training signal for calibrating configuration parameters of the antennas of the base station. Furthermore, the user equipment may provide one or more antennas and associated transceivers for enabling transmission of radio frequency signals according to the above-described MIMO technology. Additionally, the user equipment may be capable of receiving requests to change the above-described transmission scheme from payload information block to payload information block or according to a received transmission scheme profile.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
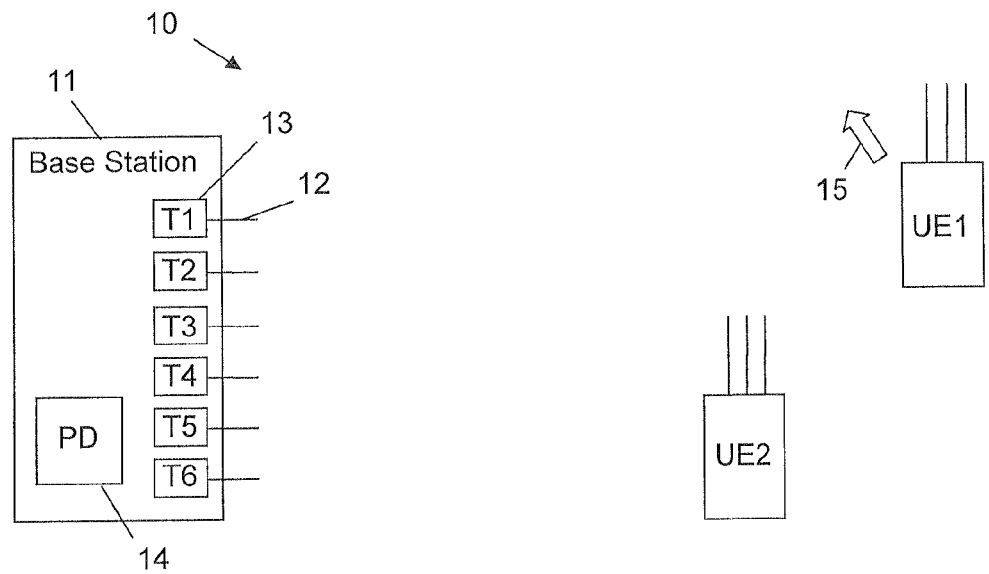
FIG. 1 shows schematically a base station and user equipments according to embodiments of the present invention.

FIG. 1 shows two user equipments UE1 and UE2 arranged in an environment 10 of a base station 11. The base station 11 comprises a plurality of antennas 12 and associated transceivers 13, wherein in FIG. 1 only six antennas 12 and six transceivers 13 are shown for clarity reasons. However, the base station 11 may comprise for example an array of thirty to one hundred or even more antennas arranged for example in a matrix or cylindrically. Likewise, the user equipments UE1 and UE2 may comprise each one or more antennas, e.g. each user equipment may comprise one to four antennas. The base station 11 comprises furthermore a processing device (PD) 14 coupled to the transceivers 13 and adapted to configure the transceivers 13 for transmitting radio frequency signals between the base station 11 and the user equipments UE1 and UE2. The multiple antennas 12 and transceivers 13 of the base station 11 may be used and configured such that the above-described multiple-input and multiple-output (MIMO) technology may be utilized for transmissions between the base station 11 and the user equipments UE1 and UE2.

For determining configuration parameter sets for the transceivers 13 of the base station 11 which provide a good transmission performed taking into account spatial information of the user equipment with respect to the base station 11, a training signal or training sequence of radio frequency signals may be transmitted from the corresponding user equipment to the base station 11, and corresponding configuration parameters for the transceivers 13 may be determined based on the received training signal. However, when the user equipment UE1 is moving, as for example indicated by arrow 15 in FIG. 1, the transmission quality will degrade unless the configuration parameters are updated for the new position. An update may be performed by transmitting a further training signal and determining updated configuration parameters based on the training signal received at the base station 11. However, this limits the speed with which the user equipments are allowed to move without degrading transmission performance. Reducing the interval between emitting the training signals from the user equipments to the base station may reduce overall system performance. To avoid more frequent transmissions of training signals, the transmission between the user equipment UE1 and the base station 11 may be established more robust when the user equipment UE1 is moving as will be explained in more detail in the following in connection with FIGS. 2-4.

Figure 2:
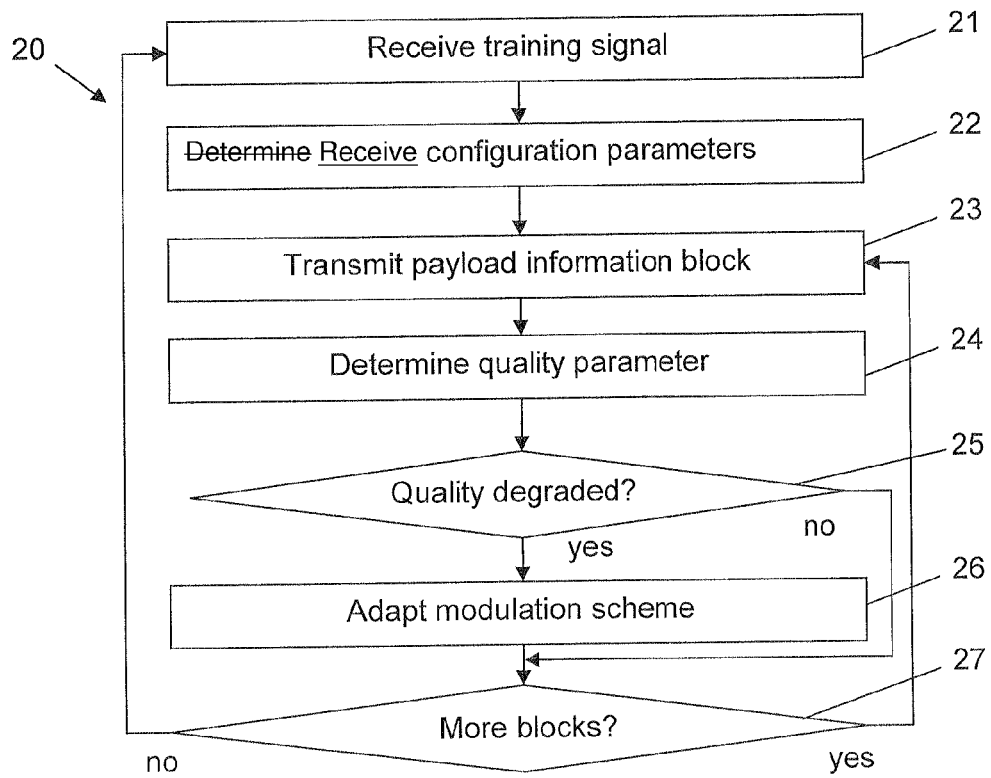
FIG. 2 shows a flowchart comprising method steps for adapting a transmission scheme according to an embodiment of the present invention.

FIG. 2 shows a method 20 with method steps 21-27 performed in the base station 11 of FIG. 1. In step 21 the training signal from a user equipment is received at the base station 11. During reception of the training signal from one user equipment, for example from user equipment UE1, all other user equipments within a cell served by the base station 11 may be silent, i.e. during the time the user equipment UE1 is transmitting the training signal, the user equipment UE2 does not transmit any radio frequency signal. This can be accomplished for example by a corresponding instruction sent from the base station 11 as a broadcast to all user equipments within the cell served by the base station 11 or by assigning dedicated time slots to each of the user equipments such that for transmitting training signals each time slot is used by one user equipment only, whereas the other user equipments do not transmit any radio frequency signals during this time slot. As an alternative, signals from the other user equipments may be separated from the training signals by for example an orthogonal coding such that each user equipment can be individually distinguished. In step 22, a set of configuration parameters for the transceivers 13 of the base station 11 is determined based on the received training signal. For example, for each transceiver 13 a corresponding configuration parameter comprising for example an amplitude and a phase value or a plurality of pairs comprising each an amplitude and a phase value may be determined.

Figure 3:
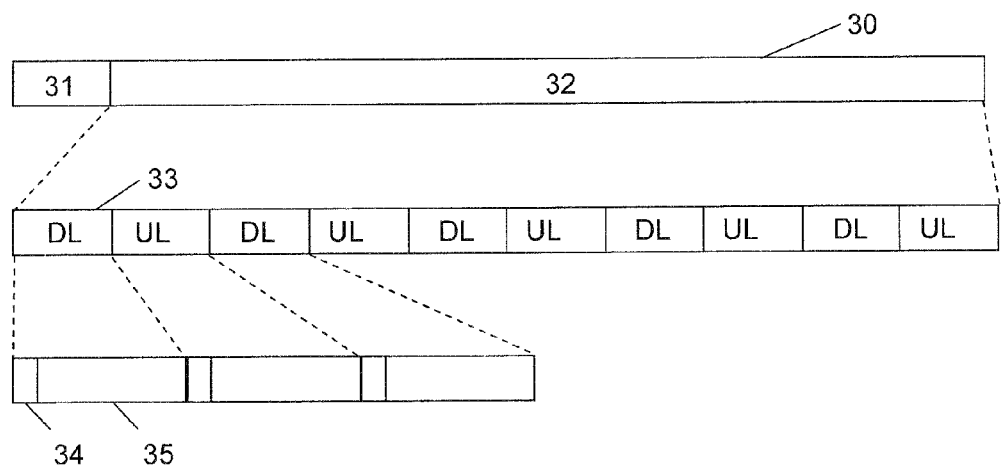
FIG. 3 shows an adaption of a transmission scheme according to an embodiment of the present invention during transmission of a transmission frame.
Figure 4:
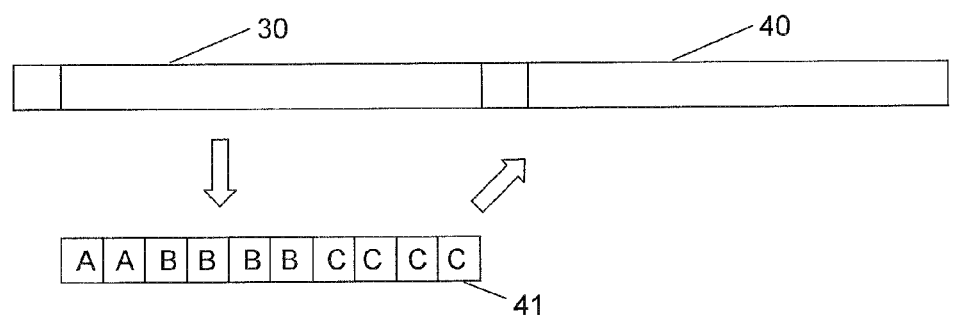
FIG. 4 shows determining and utilizing a transmission scheme profile according to an embodiment of the present invention during transmission of a plurality of transmission frames.

FIG. 3 shows an exemplary time divisional duplex (TDD) time slot 30 comprising a header 31 and a payload area 32. The above-described training signal may be transmitted as part of the header 31. The payload area 32 comprises a plurality of payload information blocks 33 which may be transmitted as so-called downlink (DL) information from the base station 11 to the user equipment, or as so-called uplink (UL) information from the user equipment to the base station 11. The payload area 32 may comprise a plurality of uplink and downlink payload information blocks 33. Each payload information block 33 may comprise an acknowledging section 34 and a payload section 35. According to the method shown in FIG. 2, in step 23 a payload information block 33 is transmitted. Based on the transmitted payload information block 33, a quality parameter is determined in step 24, for example a bit error rate (BER). For example, the quality parameter may be determined for uplink information blocks in the base station 11 and for downlink information blocks in the user equipment UE1 or UE2. The quality parameter determined in the user equipment UE1 or UE2 may be transmitted in the acknowledging section 34 to the base station 11 for further processing. In step 25 it is determined, if the quality of the transmitted payload information block 33 is degraded, and in case of a degradation, a transmission scheme is adapted in step 26. The transmission scheme may comprise for example an error correction scheme used for transmitting payload information blocks, a radio frequency modulation scheme or a digital coding scheme used in connection with a transmission of payload information blocks. In step 27 it is determined if some more blocks 33 of the transmission frame 30 are to be transmitted and in this case, the method is continued in step 23. Otherwise, a next transmission frame 30 is transmitted starting with receiving the training signal in step 21.

The adapted transmission scheme determined in step 26 may be communicated from for example the base station 11 to the corresponding user equipment in the acknowledgement section 43 such that the adapted transmission scheme may be used for transmitting the next payload information block 33. Thus, when the user equipment UE1 is moving in the direction of arrow 15, there might be an erosion in the validity of the training sequence. Hence, the bit error rate increases along the frame 30. This can be avoided or compensated, if for example an error correction is increased or a modulation scheme is changed along the transmission frame 30.

As explained in connection with FIG. 3, the transmission scheme may be adapted after each payload information block 33 and the updated transmission scheme may be communicated within the acknowledgment section 34 to be used for the next payload section 35. However, as shown in connection with FIG. 4, during transmission of the first transmission frame 30, a transmission scheme profile 41 may be determined as will be explained in the following. During transmission of the payload information blocks 33 of the first transmission frame 30, for each payload information block 33 a corresponding quality parameter is determined and based on the determined quality parameter an adapted transmission scheme is determined. In the example shown in FIG. 4, the first transmission frame 30 comprises ten payload information blocks and based on the quality parameters determined for each of the ten payload information blocks the following transmission schemes are determined: for the first two payload information blocks a transmission scheme A is sufficient, whereas for the next four payload information blocks a transmission scheme B is required which provides for example an enhanced error correction scheme, radio frequency modulation scheme or digital coding scheme, and for the last four payload information blocks an even more enhanced transmission scheme C is required for ensuring a reliable transmission of the payload data. The sequence of transmission schemes AABBBBCCCC may be used for transmitting the second transmission frame 40 assuming that the user equipment UE1 will continue moving during the second transmission frame 40 as during the first transmission frame 30. The transmission scheme profile 41 may be communicated between the base station 11 and the user equipment UE1 within the header 31 of the second transmission frame 40 or may be communicated as described before in connection with FIG. 3 in each of the acknowledging sections 34 of each payload information block 33.

Due to the adaption of the transmission scheme, a required transmission quality may be provided. However, due to the enhanced error correction scheme or digital coding scheme, a data rate may be reduced. Hence, when the user equipment is not moving, like the user equipment UE2 in FIG. 1, a use of enhanced transmission schemes is not necessary and thus a high data rate may be maintained. Therefore, the dynamic adaption of the transmission scheme ensures improved robustness for a moving user equipment like user equipment UE1, and a high data rate in case the user equipment is not moving, as for example user equipment UE2.

The invention claimed is:

1. A method for operating a base station in a wireless radio network, the base station comprising a plurality of antennas for transmitting radio frequency signals between the base station and a user equipment, the method comprising:
    receiving, at the base station, at each antenna of a subset of the plurality of antennas a training signal sent from the user equipment;
    determining for each antenna of the subset a corresponding configuration parameter based on the training signal received at the corresponding antenna;
    transmitting a plurality of payload information blocks between the base station and the user equipment using the determined configuration parameters for the antennas and a predetermined transmission scheme;
    receiving a transmission quality parameter based on at least one payload information block of the plurality of payload information blocks; and
    determining an adapted transmission scheme based on the received transmission quality parameter.

2. The method according to claim 1, wherein the plurality of payload information blocks comprises at least a sequence of a first payload information block, wherein the method comprises:
    receiving the transmission quality parameter of the first payload information block,
    determining the adapted transmission scheme based on the received transmission quality parameter of the first payload information block, and
    transmitting a second payload information block using the adapted transmission scheme.

3. The method according to claim 1, wherein at least a first transmission frame and a second transmission frame are transmitted subsequently between the base station and the user equipment, wherein each transmission frame comprises a corresponding training sequence and a corresponding plurality of payload information blocks, wherein the method comprises:
    determining a plurality of adapted transmission schemes based on corresponding transmission quality parameters determined for corresponding payload information blocks of the first transmission frame,
    determining a transmission scheme profile based on the plurality of adapted transmission schemes, and
    transmitting the payload information blocks of the second transmission frame using the transmission scheme profile, wherein the transmission scheme profile defines for each payload information block to be transmitted a corresponding transmission scheme.

4. The method according to claim 1, wherein the training sequence and the plurality of payload information blocks are transmitted within one time slot of a time division duplexing transmission scheme.

5. The method according to claim 1, wherein the transmission scheme comprises at least one of a group consisting of:
 an error correction scheme,
 a radio frequency modulation scheme, and
 a digital coding scheme.

6. The method according to claim 1, wherein the quality parameter comprises at least one of a group consisting of:
 a bit error rate,
 a symbol error rate,
 a signal to noise ratio,
 a signal to interference ratio, and
 an absolute signal level.

7. The method according to claim 1, wherein the configuration parameter comprises at least one of a group consisting of:
 an amplitude information,
 a phase information,
 a parameter pair comprising an amplitude information and an associated phase information,
 a plurality of the parameter pairs, and
 a signal intensity information of a signal intensity received at the corresponding antenna during receiving the training signal.

8. The method of claim 2, wherein the second payload information block is included in a transmission frame that includes the first payload information block.

9. A base station for a wireless radio network, comprising:
 a plurality of antennas for transmitting radio frequency signals between the base station and a user equipment; and
 a processing device configured to
  receive at each antenna of a subset of the plurality of antennas a training signal sent from the user equipment,
  determine for each antenna of the subset a corresponding configuration parameter based on the training signal received at the corresponding antenna, and
  transmit a plurality of payload information blocks between the base station and the user equipment using the determined configuration parameters for the antennas and a predetermined transmission scheme,
 receive a transmission quality parameter based on at least one payload information block of the plurality of payload information blocks, and
 determine an adapted transmission scheme based on the received transmission quality parameter.

10. The base station according to claim 9, wherein the plurality of payload information blocks comprises at least a sequence of a first payload information block, wherein the processing device is configured to:
 receive the transmission quality parameter of the first payload information block,
 determine the adapted transmission scheme based on the received transmission quality parameter of the first payload information block, and
 transmit a second payload information block using the adapted transmission scheme.

11. The base station according to claim 9, wherein the base station is configured for subsequently transmitting at least a first transmission frame and a second transmission frame between the base station and the user equipment, wherein each transmission frame comprises a corresponding training sequence and a corresponding plurality of payload information blocks, wherein the processing device is configured to:
 determine a plurality of adapted transmission schemes based on corresponding transmission quality parameters determined for corresponding payload information blocks of the first transmission frame,
 determine a transmission scheme profile based on the plurality of adapted transmission schemes, and
 transmit the payload information blocks of the second transmission frame using the transmission scheme profile, wherein the transmission scheme profile defines for each payload information block to be transmitted a corresponding transmission scheme.

12. The base station according to claim 9, wherein the training sequence and the plurality of payload information blocks are transmitted within one time slot of a time division duplexing transmission scheme.

13. The base station according to claim 9, wherein the transmission scheme comprises at least one of a group consisting of:
 an error correction scheme,
 a radio frequency modulation scheme, and
 a digital coding scheme.

14. The base station according to claim 9, wherein the quality parameter comprises at least one of a group consisting of:
 a bit error rate, and
 a symbol error rate.

15. The base station according to claim 9, wherein the configuration parameter comprises at least one of a group consisting of:
 an amplitude information,
 a phase information,
 a parameter pair comprising an amplitude information and an associated phase information,
 a plurality of the parameter pairs, and
 a signal intensity information of a signal intensity received at the corresponding antenna during receiving the training signal.

16. A user equipment for a wireless radio network, wherein the user equipment is configured for transmission of radio frequency signals between the user equipment and the base station according to claim 9.

17. The base station of claim 9, wherein the second payload information block is included in a transmission frame that includes the first payload information block.

* * * * *